(No Model.)
T. A. EDISON.
SYSTEM OF ELECTRIC LIGHTING.
No. 251,551. Patented Dec. 27, 1881.
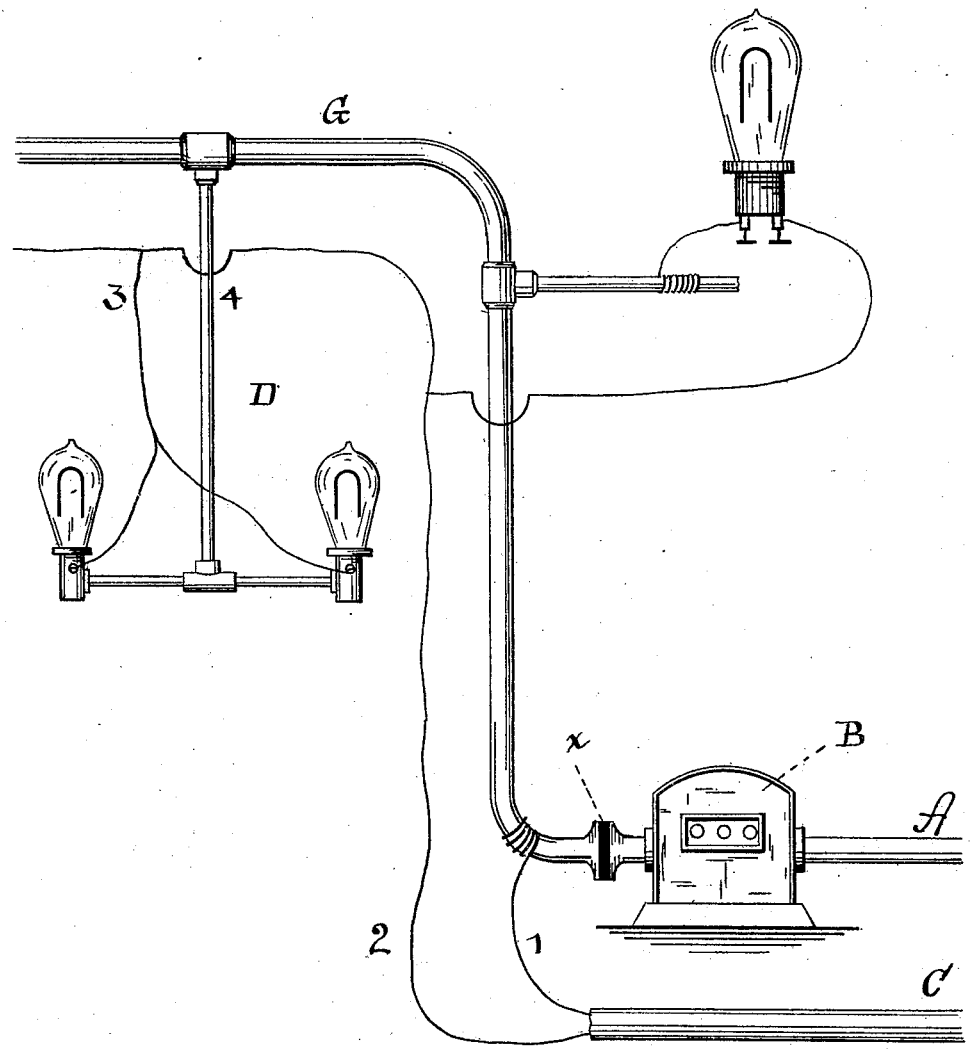
WITNESSES:
INVENTOR:
T. A. Edison
BY Dyer & Wilber
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF ELECTRIC LIGHTING.

SPECIFICATION forming part of Letters Patent No. 251,551, dated December 27, 1881.

Application filed August 30, 1881. (No model.)

*To all whom it may concern:*

Be it known that I, THOMAS A. EDISON, of Menlo Park, in the county of Middlesex and State of New Jersey, have invented a new and useful Improvement in Systems of Electric Lighting; and I do hereby declare that the following is a full and exact description of the same, reference being had to the accompanying drawing, and to the letters of reference marked thereon.

In a system of furnishing light and power by electricity it may be sometimes convenient to utilize the system of gas pipes and fixtures already existing in a house as conductors for the current without interfering, if so desired, with their legitimate use. The object of this invention is to furnish means for so doing. The main conductors of electricity enter the house, and at a point beyond the gas-meter one of them is connected with the main gas-pipe, an insulating-joint being formed in the pipe between this point and the meter, in order to prevent the current from passing through the meter to the ground. The other wire passes through the house to the various translating devices, at each of which a branch from the main wire form together a multiple-arc circuit, in which is placed a lamp or other translating device. This is shown in the annexed drawing, in which C is the main street-conductor of electricity leading into the house, and A that of gas, having the meter B placed in it. The electric wires branch, one being connected to the interior gas-pipe, G, while the other leads to the various parts of the house to be supplied with current.

In order that a ground-circuit may not be formed through the meter, the joint $x$ is formed of insulating material, so that no current can pass in that direction. The circuit is thus formed by the pipe G and wire 2, and derived circuits are formed therefrom, as at D, which represents a fixture containing lamps. Here a branch, D, leads from G, and a branch, 3, from 2, forming a derived or multiple-arc circuit to the fixture, from which others may be formed to each lamp. The insulated wire may pass through the chandelier or fixture to form these circuits, or may lie parallel with or be wound around it.

What I claim is—

1. A complete or round metallic circuit for houses, one main branch or conductor of which is the system of gas-pipes of the house, electrically disconnected from the earth, while the other main branch or conductor is formed of insulated wire, substantially as set forth.

2. The combination, in an electric circuit within a house, of a gas-pipe having an insulating-joint, a wire conductor connected thereto upon the house side of such joint, and a wire conductor leading through the house, substantially as described.

This specification signed and witnessed this 21st day of May, 1881.

THOS. A. EDISON.

Witnesses:
  H. W. SEELY,
  RICHD. N. DYER.